United States Patent
Ohashi

(10) Patent No.: US 9,962,679 B2
(45) Date of Patent: *May 8, 2018

(54) METHOD FOR MANUFACTURING POROUS BODY

(71) Applicant: Toyota Jidosha Kabushiki Kaisha, Toyota-shi, Aichi-ken (JP)

(72) Inventor: Yoshio Ohashi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/476,129

(22) Filed: Mar. 31, 2017

(65) Prior Publication Data

US 2017/0312734 A1 Nov. 2, 2017

(30) Foreign Application Priority Data

Apr. 28, 2016 (JP) ................. 2016-090324

(51) Int. Cl.
*B01J 20/30* (2006.01)
*B01J 20/22* (2006.01)

(52) U.S. Cl.
CPC ............. *B01J 20/226* (2013.01); *B01J 20/30* (2013.01)

(58) Field of Classification Search
CPC ................ B01J 20/30; B01J 20/226
USPC ........................................ 502/401
See application file for complete search history.

(56) References Cited

U.S. PATENT DOCUMENTS

2007/0227898 A1 10/2007 Muller et al.

FOREIGN PATENT DOCUMENTS

| JP | 2002-001106 A | 1/2002 |
| JP | 2011-064336 A | 3/2011 |

OTHER PUBLICATIONS

Zhang, Jianjun et al , "Temperature and Concentration Control Over Interpenetration in a Metal-Organic Material", J. AM. Chem. Soc., 2009, 131, p. 17040-17041.

*Primary Examiner* — Edward Johnson
(74) *Attorney, Agent, or Firm* — Dinsmore & Shohl LLP

(57) ABSTRACT

Provided is a method for manufacturing a porous body by which a porous body including a plurality of layers different from each other in pore diameter may be manufactured by a fewer steps than before. The method includes: synthesizing a mixture of a non-interpenetrated metal-organic framework and an interpenetrated metal-organic framework; and obtaining a porous body including a stack of a non-interpenetrated metal-organic framework layer and an interpenetrated metal-organic framework layer from the mixture synthesized in the synthesizing, via a process of separating the non-interpenetrated metal-organic framework and the interpenetrated metal-organic framework from each other by utilizing density differences.

4 Claims, 6 Drawing Sheets

METHOD FOR MANUFACTURING POROUS BODY

CROSS-REFERENCE TO RELATED APPLICATIONS

This application claims priority to Japanese Patent Application No. 2016-090324 filed Apr. 28, 2016 which is incorporated herein by reference in its entirety including the specification, drawings and abstract.

TECHNICAL FIELD

The present disclosure relates to methods for manufacturing a porous body including a plurality of metal-organic framework layers different from each other in pore diameter.

BACKGROUND

Metal-organic frameworks (hereinafter may be referred to as "MOF"), which are porous compounds, have been researched and developed recently as materials having functions of gas storage, separation and the like.

As a technique related to porous compounds, for example Patent Literature 1 discloses a functional element for dehumidification or heat exchange, including a moisture absorbing material that is a porous body of pure silica or a silica-based porous body having uniform nanopore structure, whose pore diameter can be precisely controlled into the range of 0.5 to 5 nm, arranged in a manner that the pore diameter is made small gradually or in a stepwise fashion from the inlet side of the air to be treated to the outlet side. Patent Literature 1 discloses that the control of the pore diameter is carried out by changing the kind of surfactant in a manufacturing process of the porous body of pure silica or the silica-based porous body having nanopore structure.

Patent Literature 2 discloses a method for absorbing and/or storing gas, including bringing the gas to be stored into contact with a MOF electrochemically manufactured under the conditions suitable for absorption of the gas, carrying out absorption of the gas to the MOF, and if appropriate, subsequently changing the above conditions so that the stored gas is released.

Non-Patent Literature 1 discloses synthesis conditions of an interpenetrated MOF and a non-interpenetrated MOF (hereinafter the former may be referred to as "inter MOF" and the latter may be referred to as "non-inter MOF").

CITATION LIST

Patent Literature

Patent Literature 1: JP 2002-1106 A
Patent Literature 2: JP 2011-64336 A

Non-Patent Literature

Non-Patent Literature 1: J. AM. CHEM. SOC. 2009, 131, pp. 17040-17041

SUMMARY

Technical Problem

In manufacturing a porous body including a stack of a plurality of layers different from each other in pore diameter, especially with the technique to control the pore diameter by changing surfactants, which is disclosed in Patent Literature 1, different surfactants are needed to synthesize layers different in pore diameter. That is, in manufacturing a porous body including a stack of a plurality of layers different from each other in pore diameter with this technique, there is a drawback that the number of manufacturing steps increases because a heat treatment and removal of surfactant are needed for each layer. Patent Literature 2 only discloses a method for absorbing and/or storing gas with a MOF. Non-Patent Literature 1 only discloses synthesis conditions of an interpenetrated MOF and a non-interpenetrated MOF. Thus, it is difficult to manufacture a porous body including a plurality of layers different in pore diameter by a small number of steps, even though these techniques are simply combined.

An object of the present disclosure is to provide a method for manufacturing a porous body, by which a porous body including a stack of plurality of layers different from each other in porous diameter can be manufactured by fewer steps than before.

Solution to Problem

The inter MOF and the non-inter MOF are different in density. As a result of intensive research, the inventor of the present disclosure found that it is possible to manufacture a porous body including a plurality of MOF layers (inter MOF layer and non-inter MOF layer) different from each other in pore diameter, without using different surfactants for layers different in pore diameter, by synthesizing the MOFs under the conditions of raw material concentration and temperature on which the mixture of the MOFs can be synthesized, thereafter separating the inter MOF and the non-inter MOF utilizing their density difference. The present disclosure has been completed based on this finding.

In order to solve the above problem, the present disclosure is directed to the following embodiments. That is, an embodiment of the present disclosure is a method for manufacturing a porous body including: synthesizing a mixture of a non-interpenetrated metal-organic framework and an interpenetrated metal-organic framework; and obtaining a porous body including a stack of a non-interpenetrated metal-organic framework layer and an interpenetrated metal-organic framework layer from the mixture synthesized in the synthesizing, via a process of separating the non-interpenetrated metal-organic framework and the interpenetrated metal-organic framework from each other by utilizing density differences.

By having such a configuration, it is possible to synthesize the non-inter MOF and the inter MOF different from each other in pore diameter by one synthesis step, and it is possible to obtain a porous body by one separation-and-stack step by utilizing their density difference. This makes it possible to manufacture a porous body including a plurality of layers different from each other in pore diameter by fewer steps than before.

In the above-described present disclosure, the mixture may be synthesized by hydrothermal synthesis or solvothermal synthesis. By synthesizing the mixture by these methods, the porous body can be easily manufactured.

In the above-described present disclosure, the separating may include separating the non-interpenetrated metal-organic framework and the interpenetrated metal-organic framework from each other by sedimentation or centrifugal separation. This makes it possible to easily obtain the above-described porous body.

According to an embodiment of the present disclosure, it is possible to provide a method for manufacturing a porous body, by which a porous body including a plurality of layers different from each other in pore diameter can be manufactured by fewer steps than before.

DESCRIPTION OF EMBODIMENT

Hereinafter the various embodiments and aspects of the present disclosure will be explained below with reference to the drawings. The embodiments shown below are examples of the present disclosure, and the present disclosure is not limited to the embodiments shown below.

Figure 1:
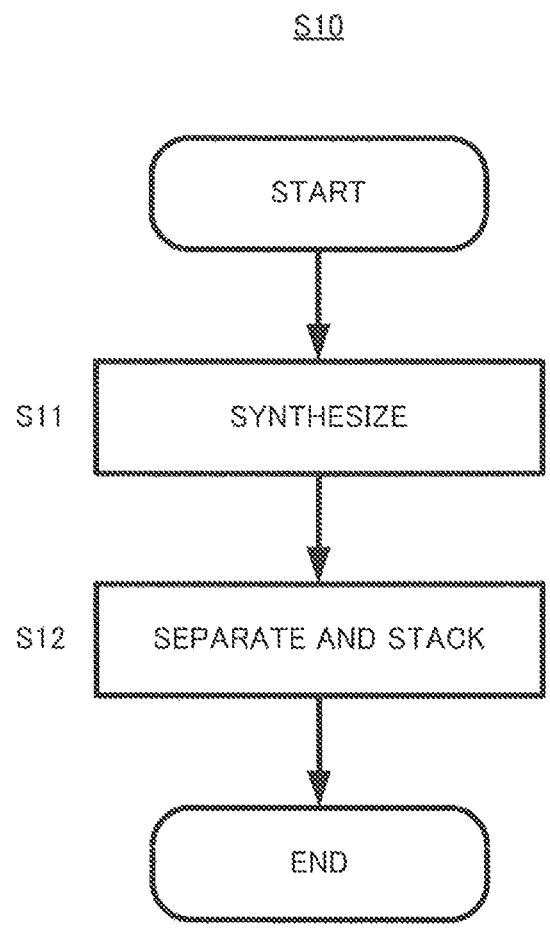
FIG. 1 is a view to explain a method for manufacturing a porous body of the present disclosure.
Figure 2:
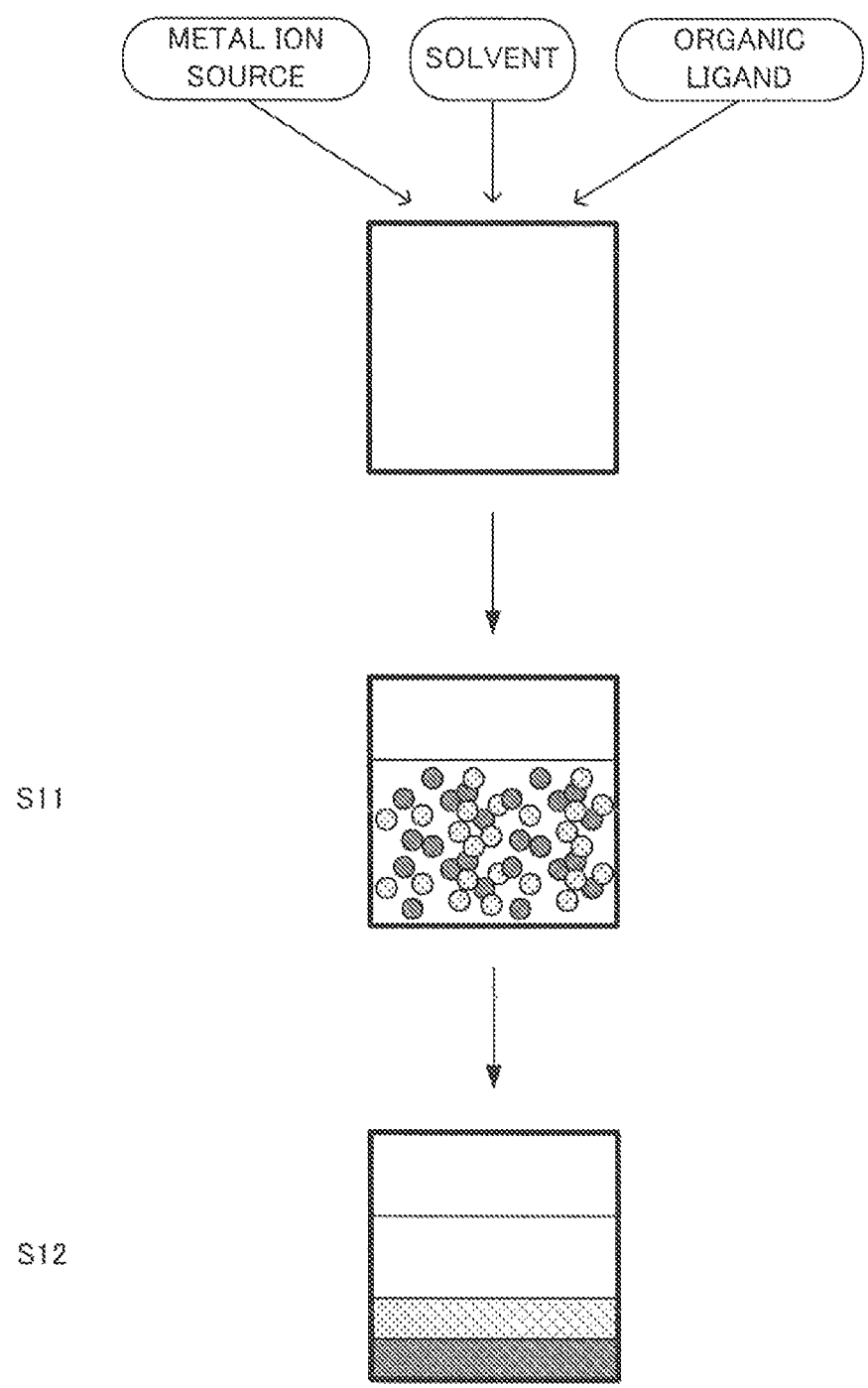
FIG. 2 is a view to explain the method for manufacturing a porous body of the present disclosure.

FIGS. 1 and 2 are views to explain a manufacturing method of the present disclosure. As shown in FIG. 1, a manufacturing method S10 of the present disclosure includes a synthesis step (S11) and a separation-and-stack step (S12).

1. Synthesis Step (S11)

The synthesis step (hereinafter may be referred to as "S11") is a step of synthesizing a mixture of a non-inter MOF and an inter MOF. More specifically, S11 is a step of synthesizing a mixture of a non-inter MOF and an inter MOF by synthesizing the MOFs under the conditions of raw material concentration and temperature on which the mixture of the non-inter MOF and the inter MOF can be synthesized. Here, "raw material concentration" means the concentration of metal ions and organic ligands used for synthesis of the MOFs, in a solution in which the metal ions and organic ligands are dissolved in a solvent.

Figure 3A:
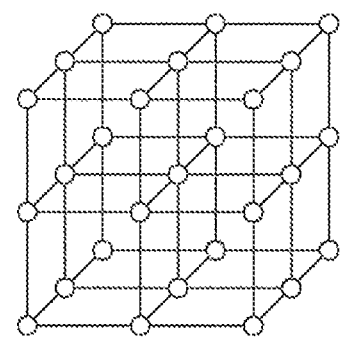
FIG. 3A is a view to explain a configuration example of a non-interpenetrated metal-organic framework.
Figure 3B:
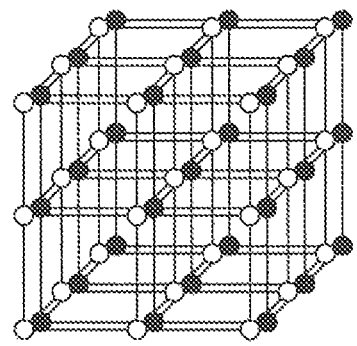
FIG. 3B is a view to explain a configuration example of an interpenetrated metal-organic framework.

FIG. 3A is a view to explain a configuration example of the non-inter MOF. FIG. 3B is a view to explain a configuration example of the inter MOF. For the sake of easy understanding that there are a plurality of frameworks, the color of vertexes is shown differently by each framework in FIG. 3B. However, the plurality of frameworks that constitute the inter MOF have the same structure.

The non-inter MOF shown in FIG. 3A is formed of a single framework (one kind). The inter MOF shown in FIG. 3B has a structure in which a plurality of frameworks are intertwined with each other. In this way, the non-inter MOF and the inter MOF are different in structure, therefore different from each other in characteristic. The main characteristics of the non-inter MOF and the inter MOF are shown in Table 1.

TABLE 1

|  | Pore diameter | Pore volume | Adsorption humidity | Density |
| --- | --- | --- | --- | --- |
| Non-inter MOF | large | large | high | small |
| Inter MOF | small | small | low | large |

The non-inter MOF is formed of a single framework. Thus, as shown in Table 1, the diameter and volume of each pore of the non-inter MOF are larger than that of the inter MOF, and the density is smaller than that of the inter MOF. The non-inter MOF including larger pores than that of the inter MOF can adsorb a large amount of substances under a relatively high-humidity environment compared to the inter MOF.

In contrast, the inter MOF has a plurality of frameworks. Thus, as shown in Table 1, the diameter and volume of each pore of the inter MOF is smaller than that of the non-inter MOF, and the density is larger than that of the non-inter MOF. The inter MOF including smaller pores than that of the non-inter MOF can adsorb a large amount of substances under a relatively low-humidity environment compared to the non-inter MOF.

Figure 4:
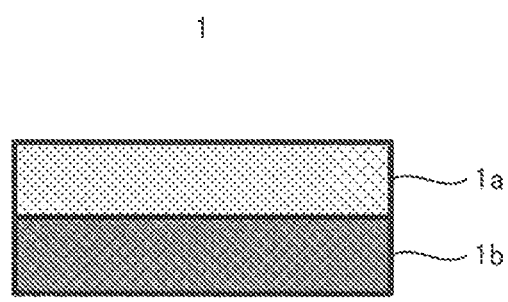
FIG. 4 is a view to explain a configuration example of a porous body manufactured by the present disclosure.

Thus, by using a porous body including a stack of a non-inter MOF layer and an inter MOF layer as an adsorption material, it is possible to adsorb substances in a wide range of humidity. FIG. 4 shows a configuration example of a porous body that can be manufactured by the present disclosure. A porous body 1 shown in FIG. 4 includes a non-inter MOF layer 1a and an inter MOF layer 1b.

In order to synthesize the inter MOF, the frameworks need to be intertwined with each other. In order to get the frameworks to be intertwined with each other, the pore size needs to be larger than the size of the substance that forms each vertex of the frameworks (oxide cluster). In order to form a framework of large pore, it is effective to make the size of the oxide cluster small, and to make the substance that forms each side of the framework (organic ligand) long. Here, the size of the oxide cluster relates to the metal ion source, and different organic ligands may have different lengths. Thus, in order to synthesize a mixture of the non-inter MOF and the inter MOF, it is necessary to use appropriate raw materials (metal ion source and organic ligand).

Further, the non-inter MOF is easily synthesized with a low concentration of raw materials and at a low synthesis temperature. The inter MOF is easily synthesized with a high concentration of raw materials and at a high synthesis temperature. Thus, in order to synthesize a mixture of the non-inter MOF and the inter MOF, it is also necessary to properly control the raw material concentration and the synthesis temperature.

S11 is not limited as long as raw materials with which a mixture of the non-inter MOF and the inter MOF can be synthesized are used and the MOFs are synthesized under the conditions of raw material concentration and temperature on which the mixture can be synthesized. In S11, various metal ions, organic ligands and solvents may be used. In the present disclosure, the time for S11, that is, the time for the synthesis of the non-inter MOF and the inter MOF may be determined based on the state of formation and precipitation in the solution of the MOFs which are insoluble matters.

Examples of the metal ion that forms the inter MOF by coordinate bonding with the organic ligand in S11 include $Co^{2+}$, $Ni^{2+}$, $Cu^{2+}$, $Zn^{2+}$, $Fe^{2+}$ and $Cd^{2+}$.

Examples of the metal ion source that can be used in S11 and produces $Co^{2+}$ include cobalt nitrate hexahydrate, cobalt chloride hexahydrate, and cobalt acetate tetrahydrate.

Examples of the metal ion source that can be used in S11 and produces $Ni^{2+}$ include nickel nitrate hexahydrate, nickel chloride hexahydrate, and nickel acetate tetrahydrate.

Examples of the metal ion source that can be used in S11 and produces $Cu^{2+}$ include copper nitrate trihydrate, copper chloride dihydrate, and copper acetate monohydrate.

Examples of the metal ion source that can be used in S11 and produces $Zn^{2+}$ include zinc nitrate hexahydrate, zinc chloride, and zinc acetate dihydrate.

Examples of the organic ligand that can be used in S11 and forms the MOFs by coordinate bonding with metal ions include terephthalic acid, 2,5-dimethylterephthalic acid, 2,6-naphthalenedicarboxylic acid, biphenyl-4,4'-dicarboxylic acid, 2,7-pyrenedicarboxylic acid, 4,5,9,10-tetrahydropyrene-2,7-dicarboxylic acid, 4,4'-bipyridine, and 1,4-di(4-pyridil)benzene.

Examples of the solvent that can be used in S11 and dissolves the above-described metal ion sources and organic ligands include N,N-dimethylformamide (DMF), N,N-diethylformamide (DEF), formic acid, acetic acid, methanol, ethanol, water, and mixtures thereof.

For example, in S11, when zinc nitrate hexahydrate is used as the metal ion source, terephthalic acid is used as the organic ligand, and N,N-dimethylformamide (DMF) is used as the solvent, to synthesize a mixture of the non-inter MOF and the inter MOF, the concentration of zinc ion may be 0.1 to 0.2 mol/L and the concentration of organic ligand may be 0.05 to 0.15 mol/L, as the conditions of raw material concentration. The synthesis temperature may be in the range of from 105 to 125° C. When the synthesis temperature is 120° C., the time to keep at 120° C. (synthesis time) may be 72 hours. When these raw materials and solvent are used, the mixture of the non-inter MOF and the inter MOF can be synthesized by solvothermal synthesis.

2. Separation-and-Stack Step (S12)

The separation-and-stack step (hereinafter may be referred to as "S12") is a step of obtaining a porous body including a stack of a non-inter MOF layer and an inter MOF layer from the mixture synthesized in S11, via a process of separating the non-inter MOF and the inter MOF from each other by utilizing density differences.

As shown in Table 1, the non-inter MOF and the inter MOF are different in density. The non-inter MOF and the inter MOF synthesized in S11 exist in a solution. Thus, in S12, the non-inter MOF and inter MOF contained in the mixture synthesized in S11 are separated by utilizing the difference between the density of the solution and the density of the non-inter MOF and inter MOF, and the difference between the density of the non-inter MOF and the density of the inter MOF.

For example, when the densities of the framework parts of the non-inter MOF and inter MOF excluding the pores are large (when the metal that forms the frameworks is a heavy element such as Fe and Zn), it is possible to make the density of the inter MOF in the solution (total of the density of the inter MOF and the density of the solution existing in the pores of the inter MOF) larger than the density of the non-inter MOF in the solution (total of the density of the non-inter MOF and the density of the solution existing in the pores of the non-inter MOF) by using a solvent of small density (e.g. ethanol and N,N-dimethylformamide (DMF)) in S11. As a result, it is possible to separate the inter MOF from the mixture first, thereafter accumulate the non-inter MOF on the inter MOF, by allowing the solution to stand in S12 to settle the non-inter MOF and the inter MOF, or by carrying out a centrifugal separation on the solution in S12. Thus, in this case, it is possible to obtain a porous body of a structure in which the non-inter MOF layer is stacked on the inter MOF layer.

When the densities of the framework parts of the non-inter MOF and inter MOF excluding the pores are small (when the element that forms the frameworks is light, such as Mg and Al), it is possible to make the density of the non-inter MOF in the solution (total of the density of the non-inter MOF and the density of the solution existing in the pores of the non-inter MOF) larger than the density of the inter MOF in the solution (total of the density of the inter MOF and the density of the solution existing in the inter MOF) by using a solvent of large density (e.g. nitrobenzene and carbon tetrachloride) in S11. As a result, it is possible to separate the non-inter MOF from the mixture first, thereafter accumulate the inter MOF on the non-inter MOF, by allowing the solution to stand in S12 to settle the non-inter MOF and the inter MOF, or by carrying out a centrifugal separation on the solution in S12. Thus, in this case, it is possible to obtain a porous body of a structure in which the inter MOF layer is stacked on the non-inter MOF layer.

In the pores of the non-inter MOF, whose volume is larger than the volume of the pores of the inter MOF, a larger amount of solution exists than in the pores of the inter MOF. Thus, it is possible to make the density of the non-inter MOF in the solution (total of the density of the non-inter MOF and the density of the solution existing in the pores of the non-inter MOF) larger than the density of the inter MOF in the solution (total of the density of the inter MOF and the density of the solution existing in the pores of the inter MOF) by using a solution of large density.

S12 may be a step of allowing the solution to stand to settle the non-inter MOF and the inter MOF, to obtain a porous body including a stack of a non-inter MOF layer and an inter MOF layer. In this case, the time for allowing the solution to stand may be determined by confirming the state of the sedimentation of the MOFs. The standing time may be in the range of from 3 hours to 24 hours for example.

S12 may also be a step of carrying out a centrifugal separation on the solution, to obtain a porous body including a stack of a non-inter MOF layer and an inter MOF layer. In this case, the rotation rate of the centrifugal separation may be in the range of from 1000 to 3000 rotations per minute for example, and the time for the centrifugal separation may be in the range of from 1 to 20 minutes for example.

In the present disclosure, whether or not it is possible to separate the non-inter MOF and the inter MOF from the mixture of the non-inter MOF and the inter MOF can be judged by the density difference of the non-inter MOF and the inter MOF with the solvent adsorbed to the MOFs. The densities of the non-inter MOF and the inter MOF with the solvent adsorbed to the MOFs can be calculated by confirming the pore volumes of the MOFs by nitrogen gas adsorption, in addition to confirmation of the presence or absence of the density difference in the frameworks.

For example, when the mixture of the non-inter MOF and the inter MOF is synthesized with zinc nitrate hexahydrate as the metal ion source, terephthalic acid as the organic ligand, and N,N-dimethylformamide (DMF) as the solvent, S12 may be a step of adding and dispersing the mixture synthesized in S11 in N,N-dimethylformamide (DMF), thereafter allowing the obtained dispersion to stand for 72 hours to settle the MOFs. This makes it possible to obtain a porous body of a structure in which the non-inter MOF layer is stacked on the inter MOF layer. After the porous body is obtained in this way, the porous body is dried to remove the solution contained in the porous body, whereby a porous body that can be used as an adsorption material can be obtained.

As described above, in the present disclosure, it is possible to synthesize a mixture of the non-inter MOF and the inter MOF in S11. Thus, there is no need to use different surfactants for synthesis of layers different in pore diameter. In addition, after the mixture is synthesized by one step (S11), it is possible to obtain a porous body including a stack of the non-inter MOF layer and the inter MOF layer by one step (S12). Thus, it is possible to manufacture a porous body including a plurality of layers different from each other in pore diameter by fewer steps than before.

In the above explanation relating to the present disclosure, S11 having a configuration in which zinc nitrate hexahydrate is used as the metal ion source, terephthalic acid is used as the organic ligand, and N,N-dimethyformamide (DMF) is used as the solvent is shown as an example. However, the present disclosure is not limited to this configuration. S11 may be a step of synthesizing a mixture of a non-inter MOF and an inter MOF by using zinc acetate dihydrate as the metal ion source, terephthalic acid as the organic ligand, and N,N-dimethylformamide (DMF) as the solvent. In this case, the concentration of zinc ion may be 0.1 to 0.2 mol/L and the concentration of organic ligand may be 0.05 to 0.15 mol/L as the conditions of raw material concentration. The synthesis temperature may be in the range of from 105 to 125° C. When these raw materials and solvent are used, the mixture of the non-inter MOF and inter MOF may be synthesized by solvothermal synthesis.

S11 may also be a step of synthesizing a mixture of a non-inter MOF and an inter MOF by using zinc nitrate hexahydrate as the metal ion source, 2,5-dimethyl terephthalic acid as the organic ligand, and N,N-dimethylformamide (DMF) as the solvent. In this case, the concentration of zinc ion may be 0.1 to 0.2 mol/L and the concentration of organic ligand may be 0.05 to 0.15 mol/L as the conditions of raw material concentration, and the synthesis temperature may be in the range of from 105 to 125° C. For example when zinc nitrate hexahydrate is used as the metal ion source, biphenyl-4,4'-dicarboxylic acid is used as the organic ligand, and N, N-dimethylformamide (DMF) is used as the solvent, to synthesize a mixture of a non-inter MOF and an inter MOF, the concentration of zinc ion may be 0.1 to 0.2 mol/L and the concentration of the organic ligand may be 0.05 to 0.1 mol/L as the conditions of raw material concentration, and the synthesis temperature may be in the range of from 100 to 120° C. For example when cadmium nitrate tetrahydrate is used as the metal ion source, terephthalic acid is used as the organic ligand, and N, N-dimethylformamide (DMF) is used as the solvent, to synthesize a mixture of a non-inter MOF and an inter MOF, the concentration of zinc ion may be 0.1 to 0.2 mol/L and the concentration of the organic ligand may be 0.05 to 0.15 mol/L as the conditions of the raw material concentration, and the synthesis temperature may be in the range of from 105 to 125° C. When these raw materials and solvent are used, the mixture of the non-inter MOF and the inter MOF may be synthesized by solvothermal synthesis.

S11 may also be a step of using zinc nitrate hexahydrate as the metal ion source, 2,2'-bis-trifluoromethyl-biphenyl-4,4'-dicarboxylic acid as the organic ligand, and water as the solvent, to synthesize a mixture of a non-inter MOF and an inter MOF. In this case, the concentration of zinc ion may be 0.1 to 0.2 mol/L and the concentration of organic ligand may be 0.05 to 0.1 mol/L as the conditions of the raw material concentration, and the synthesis temperature may be in the range of from 170 to 180° C. When these raw materials and solvent are used, the mixture of the non-inter MOF and the inter MOF may be synthesized by hydrothermal synthesis.

EXAMPLES (1) Manufacture of Porous Body
<Synthesis Step>

In a Teflon container (Teflon is a registered trademark of DuPont) of 180 mL in volume, 0.89 g (3 mmol) of zinc nitrate hexahydrate ($Zn(NO_3)_2 \cdot 6H_2O$), 0.40 g (2.4 mmol) of terephthalic acid ($H_2BDC$ ("BDC" represents p-(OOC-Ph-COO), and Ph represents a phenyl group)), and 20 mL of N,N-dimethylformamide (DMF) were added, and the container was sealed. After that, the contents were shaken, thereafter heated at 120° C. for 72 hours, whereby MOFs were synthesized.
<Separation-and-Stack Step>

The synthesized MOFs were put in N, N-dimethylformamide (DMF) and dispersed. Thereafter, the obtained dispersion was allowed to stand for 72 hours, whereby the MOFs were settled down.
<Dry>

After the above-described separation-and-stack step was completed, the supernatant was removed by a pipette. The obtained specimen was dried for 2 hours under a reduced-pressure atmosphere at 90° C.

(2) Measurement

A X-ray diffraction measurement was carried out on each of the upper and lower surfaces of the obtained specimen. The measurement apparatus and measurement conditions were as follows.

Measurement apparatus: RINT RAPID II (manufactured by Rigaku Corporation)

Measurement conditions: voltage 50 V, current 100 mA, collimator dia.=0.1 mm, specimen angle ω=5°

(3) Results

Figure 5:
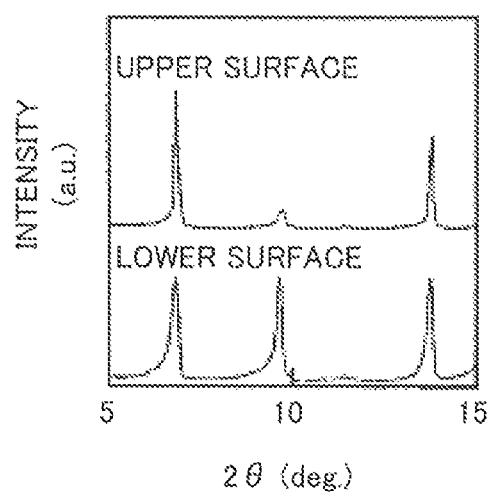
FIG. 5 is a view to show results of an X-ray diffraction measurement.

The results of the X-ray diffraction measurement are shown in FIG. 5. The result shown on the upper side of FIG. 5 is the X-ray diffraction measurement result of the upper surface of the specimen, and the result shown on the lower side of FIG. 5 is the X-ray diffraction measurement result of the lower surface of the specimen. As shown in FIG. 5, the upper surface and the lower surface of the specimen had different diffraction patterns from each other. An inter MOF has a structure in which the pore of a non-inter MOF includes another MOF framework. Therefore, in the inter MOF, the symmetry of the crystal structure degraded and the diffraction pattern in X-ray diffraction measurement was changed. It was found that non-inter MOFs existed as the upper surface of the specimen and inter MOFs existed as the lower surface of the specimen, because only a peak having a small intensity was observed around 10° for a non-inter MOF and a peak having a large intensity was observed around 10° for an inter-MOF. From the results, it was confirmed that it is possible to manufacture a porous body including a stack of a non-inter MOF layer and an inter MOF layer, according to the present disclosure.

REFERENCES SIGN LIST 1 porous body
1a non-interpenetrated metal-organic framework layer
1b interpenetrated metal-organic framework layer

The invention claimed is:

1. A method for manufacturing a porous body comprising:
   synthesizing a mixture of a non-interpenetrated metal-organic framework and an interpenetrated metal-organic framework; and
   obtaining a porous body including a stack of a non-interpenetrated metal-organic framework layer and an interpenetrated metal-organic framework layer from the mixture synthesized in the synthesizing, via a process of separating the non-interpenetrated metal-organic framework and the interpenetrated metal-organic framework from each other by utilizing density differences.

2. The method for manufacturing a porous body according to claim 1, wherein in the synthesizing, the mixture is synthesized by hydrothermal synthesis or solvothermal synthesis.

3. The method for manufacturing a porous body according to claim 1, wherein the separating includes separating the non-interpenetrated metal-organic framework and the interpenetrated metal-organic framework from each other by sedimentation or centrifugal separation.

4. The method for manufacturing a porous body according to claim 2, wherein the separating includes separating the non-interpenetrated metal-organic framework and the interpenetrated metal-organic framework from each other by sedimentation or centrifugal separation.

* * * * *